UNITED STATES PATENT OFFICE.

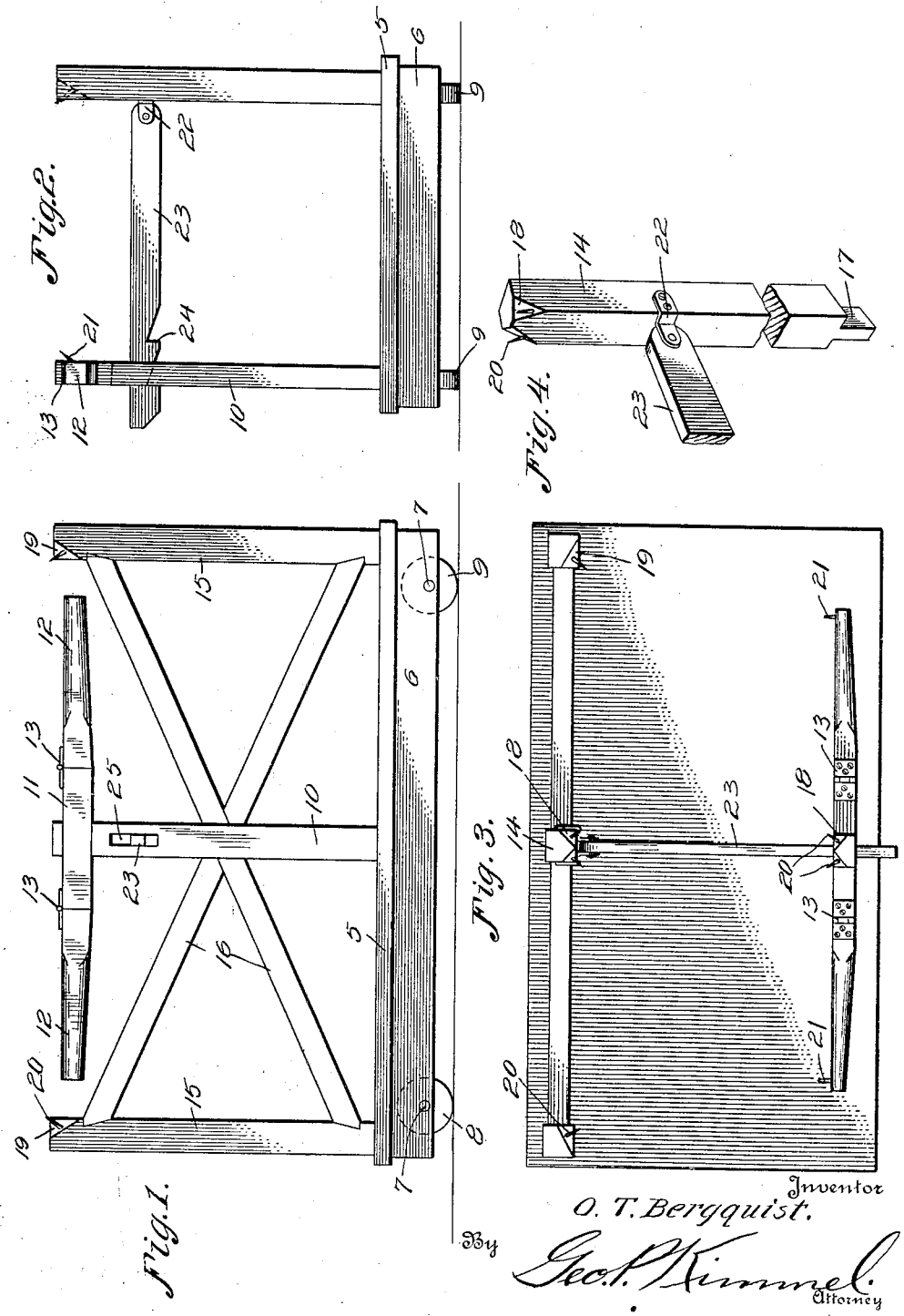

OSCAR T. BERGQUIST, OF DETROIT, MINNESOTA.

SACKING-TRUCK.

1,330,835.   Specification of Letters Patent.   Patented Feb. 17, 1920.

Application filed October 6, 1919. Serial No. 328,819.

*To all whom it may concern:*

Be it known that I, OSCAR T. BERGQUIST, a citizen of the United States, residing at Detroit, in the county of Becker and State of Minnesota, have invented certain new and useful Improvements in Sacking-Trucks, of which the following is a specification.

The invention relates to a sack holder, and more particularly to the class of sacking trucks.

The primary object of the invention is the provision of a truck of this character, wherein sack holders are mounted thereon, so that a plurality of sacks can be held for the convenient filling thereof upon the truck, the latter being movable to any desirable point for the easy filling of the sack with despatch, the holders being of novel construction to assure the holding of the sacks in open position upon the truck.

Another object of the invention is the provision of a truck of this character, wherein the sack holding supports are detachable from the platform of the truck and when secured in position thereon will be supported in proper relation to each other for the holding of the sacks in open position upon the truck, the sack holding supports being of novel form and will enable several sacks to be held thereby to permit the convenient filling of the sacks when in the holders.

A further object of the invention is the provision of a truck of this character which is comparatively simple in construction, the sack holders thereon being thoroughly reliable and efficient in their purpose, strong, and inexpensive to manufacture.

With these and other objects in view, the invention consists in the features of construction, combination and arrangement of parts, as will be hereinafter fully described, illustrated in the accompanying drawings, and pointed out in the claims hereunto appended.

In the accompanying drawing:

Figure 1 is a side elevation of the truck constructed in accordance with the invention showing the sack holders mounted thereon.

Fig. 2 is an end elevation.

Fig. 3 is a top plan view.

Fig. 4 is a fragmentary perspective view of one of the sack holding supports.

Similar reference characters indicate corresponding parts throughout the several views in the drawing.

Referring to the drawing in detail the truck comprises a platform 5, supported upon a track frame 6, in the side rails of which near opposite ends of the platform are journaled transverse axles 7 on which are mounted the front and rear traction wheels 8 and 9 respectively, so that the truck can be moved from one point to another for convenience in the use thereof.

Medially of the truck at one side of its platform 5 is a vertical post 10, the same at its lower end being removably fitted in the platform 5 and carries at its upper end a cross head or rail 11 having swingingly connected at opposite ends thereof arms 12, the same being connected to the cross head or rail 11 through the medium of hinges 13 which are secured at the upper sides of said cross rail and arms, so that the latter can be swung upwardly from normal position in longitudinal alinement with the cross head or rail 11 and when in this latter position the meeting ends of said cross head or rail 11 and arms 12 abut each other, thereby preventing the sagging of the arms 12 when holding sacks upon the truck in a manner presently described.

Removably mounted upon the platform 5 at the other side edge thereof opposite the vertical post 10 is a fence-like frame having the intermediate and outer vertical posts 14 and 15 respectively, and the cross diagonally disposed longitudinal rails 16 which are abutted in the intermediate rails 14 and in the outer posts 15, the lower ends of the posts 14 and 15, each is formed with a reduced tenon 17 adapted to be removably engaged in a correspondingly shaped socket formed in the platform 5 of the truck and in this manner the frame is removably fitted upon the platform of said truck.

The diagonal rails 16 are secured in the posts 14 and 15 in any desirable manner to render the frame rigid. The post 10 at its lower end is formed with a reduced tenon corresponding to the tenon 17 on each of the posts 14 and 15 as is clearly shown in Fig. 4 of the drawing and in this manner said post 10 is removably secured in the platform of the truck. The posts 10 and 14 at their upper ends are reversely beveled as at 18 at their inner corners, while the posts 15 at their upper ends are formed with inner beveled corners 19 and in these beveled faces 18 and 19 are secured hangers in the form of pins 20 on which are engaged the bag bodies or sacks at the mouth edges thereof for the hanging of the same in open position upon the truck and likewise secured in the arms 12 near the outer free ends thereof at their inner sides are hangers in the form of pins 21 for the engagement, the bodies of the bags or sacks thereon, so that the mouths of the bags can be held fully open to permit the dropping of potatoes or other vegetables or fruits therein in a convenient manner with despatch.

Secured to the posts 14 of the frame spaced from the upper ends thereof is a pivot bearing 22 in which is pivotally mounted a swinging brace or catch member 23 having formed near its opposite free end latch teeth 24 and this end of said member 23 is engaged in a slot 25 formed in the post 10, which slot 25 has its lower end constructed to permit the latching of the teeth therein, the member 23 being employed for preventing the outward spreading of the posts and the frame when positioned on opposite sides of the platform of the truck.

The hinging of the arms 12 to the cross head or rail 11 on the post 10 permits the rocking of said arms on the raising or lowering thereof so as to shake the contents of the bags or sacks when hung upon the holders upon the truck, thus causing settling of the contents of the bags upon the truck.

In the use of the truck several bags are engaged at their mouth ends upon the hangers 20 and 21 upon the posts 10 and 15 respectively and the arms 12 so that the mouth ends of the bags will be held open to permit the admission of vegetables or the like therein for the filling of the bags and on moving the arms 12 by raising and lowering the same the contents of the bags can be caused to settle therein for the proper filling of the same according to the capacity thereof.

The truck can be readily moved from one point to another as the same travels upon the wheels 8 and 9 enabling the truck to be located at the place where the bags are to be filled and thereby avoiding the necessity of carrying the bags by hand from one point to another.

From the foregoing it is thought that the construction and manner of use of the truck will be clearly understood and therefore a more extended explanation has been omitted.

What I claim is:

1. In a truck of the character described, a wheeled platform, a fence frame removably mounted upon the platform near one side thereof and having intermediate and outer posts, a post opposite the frame and removably secured in the platform near the opposite side thereof, and a cross head, arms swingingly connected to the ends of the cross head, a latch member carried by the frame and engageable with the posts opposite the same, and bag hangers carried by the posts of said frame and on the cross head.

2. In a truck of the character described, a wheeled platform, a frame having posts at one side thereof, a single post on said platform at the opposite side thereof and located medially with respect to said frame, vertically swinging arms carried by the last named post, means for detachably connecting the frame with said last named post, and bag hangers on said posts.

In testimony whereof I affix my signature hereto.

OSCAR T. BERGQUIST.